US012811978B2

(12) United States Patent
Kura et al.

(10) Patent No.: US 12,811,978 B2
(45) Date of Patent: Nov. 24, 2026

(54) SYSTEM AND METHOD FOR DETECTING AND PREVENTING CREDENTIAL STUFFING

(71) Applicant: Harness Inc., San Francisco, CA (US)

(72) Inventors: Swapnil Kura, Pune (IN); Jisheng Wang, Palo Alto, CA (US); Sanjay Nagaraj, Dublin, CA (US)

(73) Assignee: Harness Inc., San Francisco, CA (US)

( * ) Notice: Subject to any disclaimer, the term of this patent is extended or adjusted under 35 U.S.C. 154(b) by 60 days.

(21) Appl. No.: 18/957,931

(22) Filed: Nov. 25, 2024

(65) Prior Publication Data

US 2026/0149736 A1 May 28, 2026

(51) Int. Cl.
*H04L 9/40* (2022.01)

(52) U.S. Cl.
CPC .......... *H04L 63/1466* (2013.01); *H04L 63/02* (2013.01)

(58) Field of Classification Search
CPC ............................ H04L 63/1466; H04L 63/02
See application file for complete search history.

(56) References Cited

U.S. PATENT DOCUMENTS

| | | | | |
|---|---|---|---|---|
| 11,245,722 B1 * | 2/2022 | Senecal | H04L 63/1466 | |
| 2010/0043066 A1 * | 2/2010 | Miliefsky | H04L 63/0263 | 726/9 |
| 2012/0236753 A1 * | 9/2012 | Rados | H04L 65/1016 | 370/253 |
| 2014/0282872 A1 * | 9/2014 | Hansen | H04L 63/102 | 726/3 |
| 2018/0205748 A1 * | 7/2018 | Gurkok | H04L 63/083 | |
| 2019/0190934 A1 * | 6/2019 | Peppe | H04L 63/1441 | |
| 2020/0280573 A1 * | 9/2020 | Johnson | G06F 21/554 | |
| 2021/0152571 A1 * | 5/2021 | Varnavas | H04L 63/1425 | |
| 2021/0344708 A1 * | 11/2021 | Nicusor-Sorin | H04L 63/1466 | |
| 2024/0031368 A1 * | 1/2024 | McNamara | H04L 9/40 | |
| 2025/0086271 A1 * | 3/2025 | Achary | G06F 21/552 | |

OTHER PUBLICATIONS

Pal et al., "Beyond Credential Stuffing: Password Similarity Models using Neural Networks", May 2019, IEEE Symposium on Security and Privacy, pp. 417-434 (Year: 2019).*

* cited by examiner

*Primary Examiner* — Kenneth W Chang
(74) *Attorney, Agent, or Firm* — Jason A. Smith; Shumaker, Loop & Kendrick, LLP

(57) ABSTRACT

A method for detecting and preventing credential stuffing attacks is disclosed. The method includes receiving data pertaining to login attempts from a plurality of sources and identifying a set of sources as potentially malicious based on predefined criteria related to the login attempts. Next, the method includes determining common parameters shared among the identified set of potentially malicious sources and calculating a percentage of the potentially malicious sources from the one or more common parameters. Next, the method includes detecting an anomaly indicative of a credential stuffing attack if the calculated percentage exceeds a predefined threshold. Thereafter, the method includes performing blocking and/or mitigating login attempts associated with the detected anomaly.

16 Claims, 8 Drawing Sheets

500A

Identified Bad IPs

7/19/2024, 11:00:00 AM ~ 7/19/2024,11:00:00 PM

Total Bad IPs= 900

| Parameter | Number of Bad IPs | Information |
|---|---|---|
| IP Subnet | 800 | 192.168.1.0/24:<br>IPs: 192.168.1.5, 192.168.1.10 |
| Autonomous System Number | 500 | ASN 12345:<br>IPs: 203.0.113.5, 203.0.113.10 |
| IP Organization | 625 | Org: ExampleCorp:<br>IPs :198.51.100.5, 198.51.100.10 |
| User-Agent String | 273 | Mozilla/5.0 :<br>IPs 192.0.2.5, 192.0.2.15 |
| Request Header Fields | 90 | Header: X-Requested-With:<br>XMLHttpRequest:<br>IPs198.51.100.20, 198.51.100.25 |

FIG. 5A

500C

ANOMALY DETECTION INDICATIVE OF CREDENTIAL STUFFING

7/18/2024, 10:00:00 AM – 7/18/2024,10:00:00 PM

TOTAL BAD IPS= 900

| PARAMETER | PERCENTAGE (%) | COMPARISON WITH THRESHOLD OF 50% | BLOCK CONNECTION |
|---|---|---|---|
| IP SUBNET | 89% | MORE THAN 50% | YES |
| AUTONOMOUS SYSTEM NUMBER | 56% | MORE THAN 50% | YES |
| IP ORGANIZATION | 69% | MORE THAN 50% | YES |
| USER-AGENT STRING | 30% | LESS THAN 50% | NO |
| REQUEST HEADER FIELDS | 10% | LESS THAN 50% | NO |

FIG. 5C

SYSTEM AND METHOD FOR DETECTING AND PREVENTING CREDENTIAL STUFFING

BACKGROUND

Technical Field

The present disclosure relates to the field of cybersecurity, and particularly relates to a system and method for detecting and preventing credential stuffing.

Description of the Related Art

In today's digital landscape, online services are increasingly reliant on user authentication mechanisms, typically involving usernames and passwords. Unfortunately, the widespread practice of reusing login credentials across multiple platforms has given rise to a specific type of cyber-attack known as credential stuffing. The credential stuffing is an attack where malicious actors use credentials obtained from a data breach on one service to attempt unauthorized logins on another, unrelated service. This attack exploits the fact that many users use the same login credentials across different accounts. Automated tools enable attackers to quickly and efficiently bombard a system's login page with large volumes of stolen usernames and passwords, seeking to gain unauthorized access to user accounts. The effectiveness of credential stuffing attacks is enhanced when users fail to employ unique passwords for different services. The consequences of these attacks can be severe, leading to unauthorized access (account takeover-ATO) to personal, financial, and business accounts, resulting in identity theft, financial loss, and reputational damage for both users and service providers.

Detecting credential stuffing presents significant challenges. Traditional security measures, such as rate limiting, are often effective when attacks are performed from a single IP address, as these measures can detect and block suspicious activity based on the frequency of login attempts. However, when attackers distribute their attempts across a large number of IP addresses or use "low-and-slow" techniques to stay under detection thresholds, these conventional methods struggle to identify and mitigate the threat. In particular, distributed credential stuffing attacks involve using multiple IP addresses to execute login attempts in a way that evades detection by spreading the attempts thinly across many IPs. This allows attackers to fly under the radar of traditional detection systems, making it difficult to identify the pattern of malicious activity. As a result, existing security solutions fail to flag these attacks, leaving systems vulnerable to unauthorized access. This problem has become increasingly urgent as the volume of stolen credentials available on the dark web continues to grow, and as attackers become more sophisticated in their techniques.

Therefore, there is a need for more advanced detection methods that can identify credential stuffing attacks, particularly those that are distributed across multiple IP addresses and employ low-and-slow tactics, and overcome the above-mentioned drawbacks.

BRIEF SUMMARY

One or more embodiments are directed to a system and method (together referred to as 'disclosed mechanism') for detecting and preventing credential stuffing attacks. The disclosed mechanism addresses the challenges of credential stuffing by detecting and preventing credential stuffing attacks, even when they are distributed and subtle. Since credential stuffing is a significant cybersecurity threat where attackers use automated tools to exploit stolen login credentials across multiple online services, the disclosed mechanism addresses this threat by implementing a multi-faceted approach that includes the collection and analysis of login attempt data from various sources. In order to do that, the disclosed mechanism gathers detailed information on login attempts, including source IP addresses, user-agent strings, request body and request headers. Then, the disclosed mechanism evaluates this data against predefined criteria, identifying sources that may be engaging in malicious activity. Once potentially malicious sources are identified, a parameter analysis module determines commonalities among them, such as shared IP subnets or user-agent strings. The disclosed mechanism further quantifies the extent of these commonalities by calculating the percentage of identified sources that share the same parameters. If this percentage exceeds a predefined threshold, the disclosed mechanism flags this as indicative of a credential stuffing attack. To counter the detected threat, the disclosed mechanism blocks or otherwise mitigates login attempts associated with the identified anomaly, ensuring that the attack is effectively neutralized. The disclosed mechanism also supports dynamic adjustment of firewall rules and access control lists to prevent further unauthorized access attempts. Additionally, the disclosed mechanism generates alerts for system administrators and logs detailed information about the attack for future analysis.

The disclosed mechanism is particularly useful for any online platform or service that requires secure user authentication, including e-commerce sites, financial institutions, social media platforms, and corporate networks. The primary advantage of the disclosed mechanism is the ability to detect and prevent credential stuffing attacks that might go unnoticed by traditional security measures, especially those that rely on rate-limiting or IP-based blocking alone. By analyzing data patterns across multiple dimensions and identifying commonalities among potentially malicious sources, the disclosed mechanism provides a more nuanced and effective defense against distributed and low-and-slow credential stuffing attacks. Additionally, the disclosed mechanism helps to maintain the integrity of user accounts, reducing the risk of unauthorized access and protecting sensitive information. Thus, the disclosed mechanism enhances the overall security posture of the organization and builds trust with users by safeguarding their credentials against abuse.

An embodiment of the present disclosure relates to the system for detecting and preventing credential stuffing attacks. In an embodiment, the system includes a data collection module configured to receive data pertaining to login attempts from a plurality of sources. The data collection module is further configured to collect information related to the source IP address, user-agent, request body and request headers of each login attempt. In an embodiment, the system includes an identification module configured to identify a set of sources as potentially malicious based on predefined criteria related to the login attempts. The identification module is further configured to apply predefined criteria, including a threshold number of unique account login attempts within a specified time window from a single IP address, to identify potentially malicious sources.

In an embodiment, the system includes a parameter analysis module configured to determine one or more common parameters shared among the identified set of potentially malicious sources. The parameter analysis module is further configured to analyze one or more common parameters including IP subnet, autonomous system number (ASN), IP organization, user-agent string, and/or request header fields. In an embodiment, the system includes a calculation module configured to calculate a percentage of the potentially malicious sources from the one or more common parameters. In an embodiment, the system includes an anomaly detection module configured to detect an anomaly indicative of a credential stuffing attack if the calculated percentage exceeds a predefined threshold. The anomaly detection module is further configured to refine the predefined threshold over time by analyzing historical data to improve the accuracy of anomaly detection.

In an embodiment, the system includes a mitigation module configured to block and/or mitigate login attempts associated with the detected anomaly. The mitigation module is further configured to block API traffic associated with the detected anomaly by dynamically adjusting firewall rules and updating access control lists. The mitigation module is further configured to apply different levels of traffic blocking and mitigation based on the severity of the detected anomaly, including temporary blocking and permanent blacklisting of sources. In an embodiment, the system further includes an alert module configured to generate an alert to notify a system administrator when a credential stuffing attack is detected. In an embodiment, the system includes a logging module configured to log details of the detected credential stuffing attack for future analysis and system improvements.

An embodiment of the present disclosure relates to the method for detecting and preventing credential stuffing attacks. In an embodiment, the method includes the steps of receiving data pertaining to login attempts from a plurality of sources. In an embodiment, the method includes the steps of identifying a set of sources as potentially malicious based on predefined criteria related to the login attempts. In an embodiment, the method includes the steps of determining one or more common parameters shared among the identified set of potentially malicious sources. In an embodiment, the method includes the steps of calculating a percentage of the potentially malicious sources from the one or more common parameters. In an embodiment, the method includes the steps of detecting an anomaly indicative of a credential stuffing attack if the calculated percentage exceeds a predefined threshold. In an embodiment, the method includes the steps of performing blocking and/or mitigating login attempts associated with the detected anomaly. Further, the method includes the steps of applying different levels of traffic blocking and mitigation based on the severity of the detected anomaly, including temporary blocking, random blocking, and permanent blacklisting of sources.

In an embodiment, the method also includes the steps of generating an alert to notify a system administrator when a credential stuffing attack is detected along with a list of accounts that are potential account takeover (ATO) cases for further analysis of the impact due to the attack and taking remediation actions. Further, the method also includes the steps of logging details of the detected credential stuffing attack for future analysis and system improvements.

The features and advantages of the subject matter here will become more apparent in light of the following detailed description of selected embodiments, as illustrated in the accompanying FIGUREs. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5A illustrates an interface showing the bad IPs grouped based on one or more common parameters, in accordance with an embodiment of the present disclosure.

FIG. 5C illustrates an interface showing anomaly detection and blocking of connection based on a threshold value, in accordance with an embodiment of the present disclosure.

Figure 1:
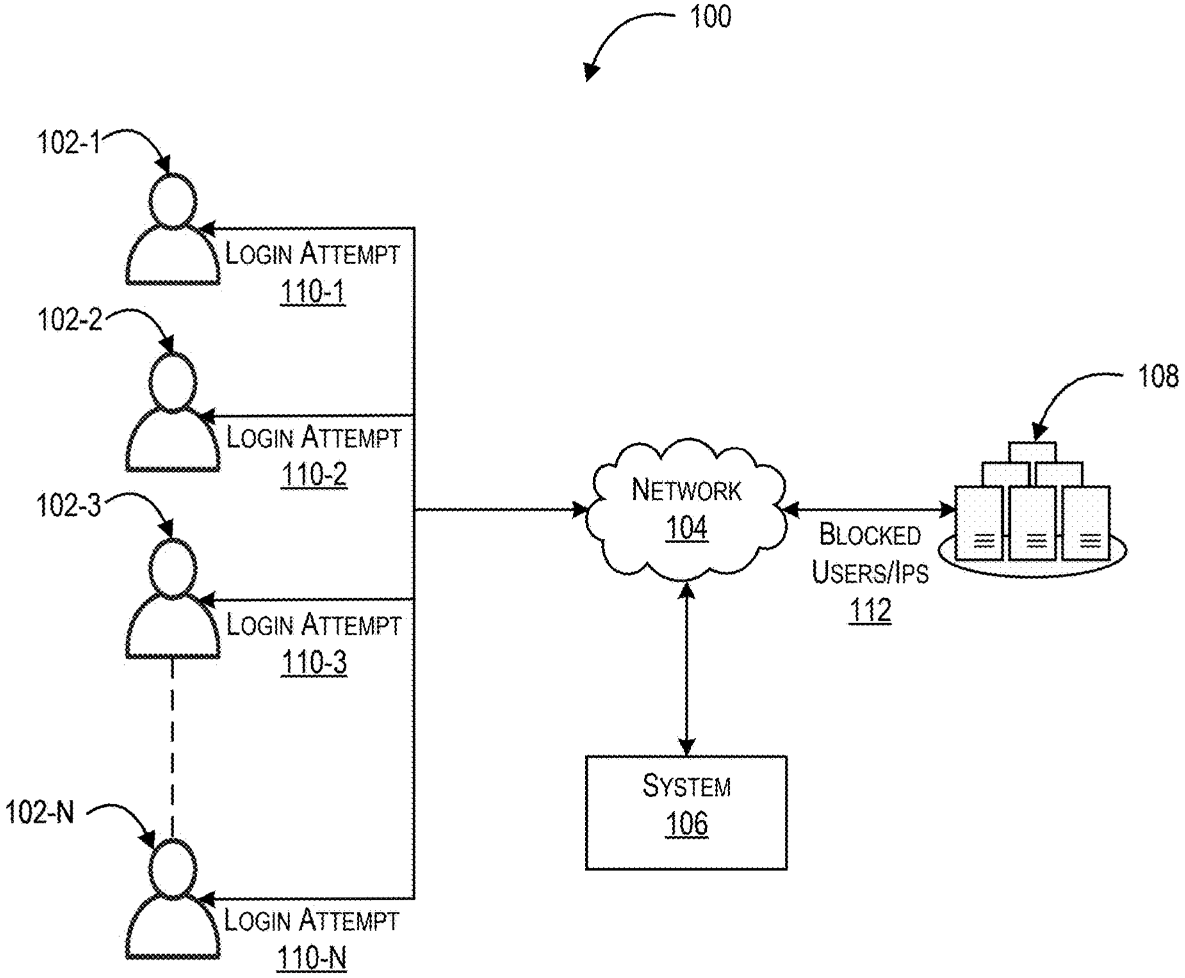
FIG. 1 illustrates an exemplary environment having a system for detecting and preventing credential stuffing attacks, in accordance with an embodiment of the present disclosure.

Other features of embodiments of the present disclosure will be apparent from accompanying drawings and detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system and method (together referred to as 'disclosed mechanism') for detecting and preventing credential stuffing attacks. The disclosed mechanism addresses the challenges of credential stuffing by detecting and preventing credential stuffing attacks, even when they are distributed and subtle. Since credential stuffing is a significant cybersecurity threat where attackers use automated tools to exploit stolen login credentials across multiple online services, the disclosed mechanism addresses this threat by implementing a multi-faceted approach that includes the collection and analysis of login attempt data from various sources. In order to do that, the disclosed mechanism gathers detailed information on login attempts, including source IP addresses, user-agent strings, and request headers. Then, the disclosed mechanism evaluates this data against predefined criteria, identifying sources that may be engaging in malicious activity. Once potentially malicious sources are identified, a parameter analysis module determines commonalities among them, such as shared IP subnets or user-agent strings. The disclosed mechanism further quantifies the extent of these commonalities by calculating the percentage of identified sources that share the same parameters. If this percentage exceeds a predefined threshold, the disclosed mechanism flags this as indicative of a credential stuffing attack. To counter the detected threat, the disclosed mechanism blocks or otherwise mitigates login attempts associated with the identified anomaly, ensuring that the attack is effectively neutralized. The disclosed mechanism also supports dynamic adjustment of firewall rules and access control lists to prevent further unauthorized access attempts. Additionally, the disclosed mechanism generates alerts for system administrators and log detailed information about the attack for future analysis.

FIG. 1 illustrates an exemplary environment 100 having a system 106 for detecting and preventing credential stuffing attacks, in accordance with an embodiment of the present disclosure.

In an embodiment, the exemplary environment 100 may include one or more users 102-1, 102-2, 103-3, . . . , 102-N (hereinafter may be termed as user 102) attempting to access a protected server 108 through a network 104. Such users 102 may be legitimate account holders or malicious actors trying to gain unauthorized access using stolen credentials through corresponding user devices, such as mobile phones, computers, laptops, tablets, routers, switches, hubs, firewalls, printers, hosts, servers, wireless access points, or the like. Each user 102 may be connected to the network 104 that may in turn be communicatively connected to the system 106 for allowing or blocking access to the protected server 108 through standard login procedures. In an embodiment, the network 104 may facilitate the transmission of data such as one or more login attempts 110-1, 110-2, 110-3, . . . , 110-N (hereinafter termed as login attempt 110). The network 104 may, without any limitation, include a direct interconnection, a Local Area Network (LAN), a Wide Area Network (WAN), a wireless network (e.g., using Wireless Application Protocol), the Internet, and the like.

Further, the system 106 may be configured to detect and prevent credential stuffing attacks. Initially, the system 106 may receive data related to the login attempts 110 from the users 102 through the network 104. The system 106 may analyze the received data to identify any potentially malicious sources that might be using credential stuffing techniques to gain unauthorized access. Next, the system 106 may detect anomalies indicative of credential stuffing by evaluating patterns, such as the frequency and distribution of login attempts across different IP addresses and user-agents. Upon detecting such anomalies, the system 106 may take actions to mitigate the threat, such as blocking the concerned users/IPs and send this list to the protected server 108, as shown by blocked users/IPs 112. Accordingly, the system 106 may block associated IP addresses or users entirely, preventing them from making additional login attempts.

Figure 2:
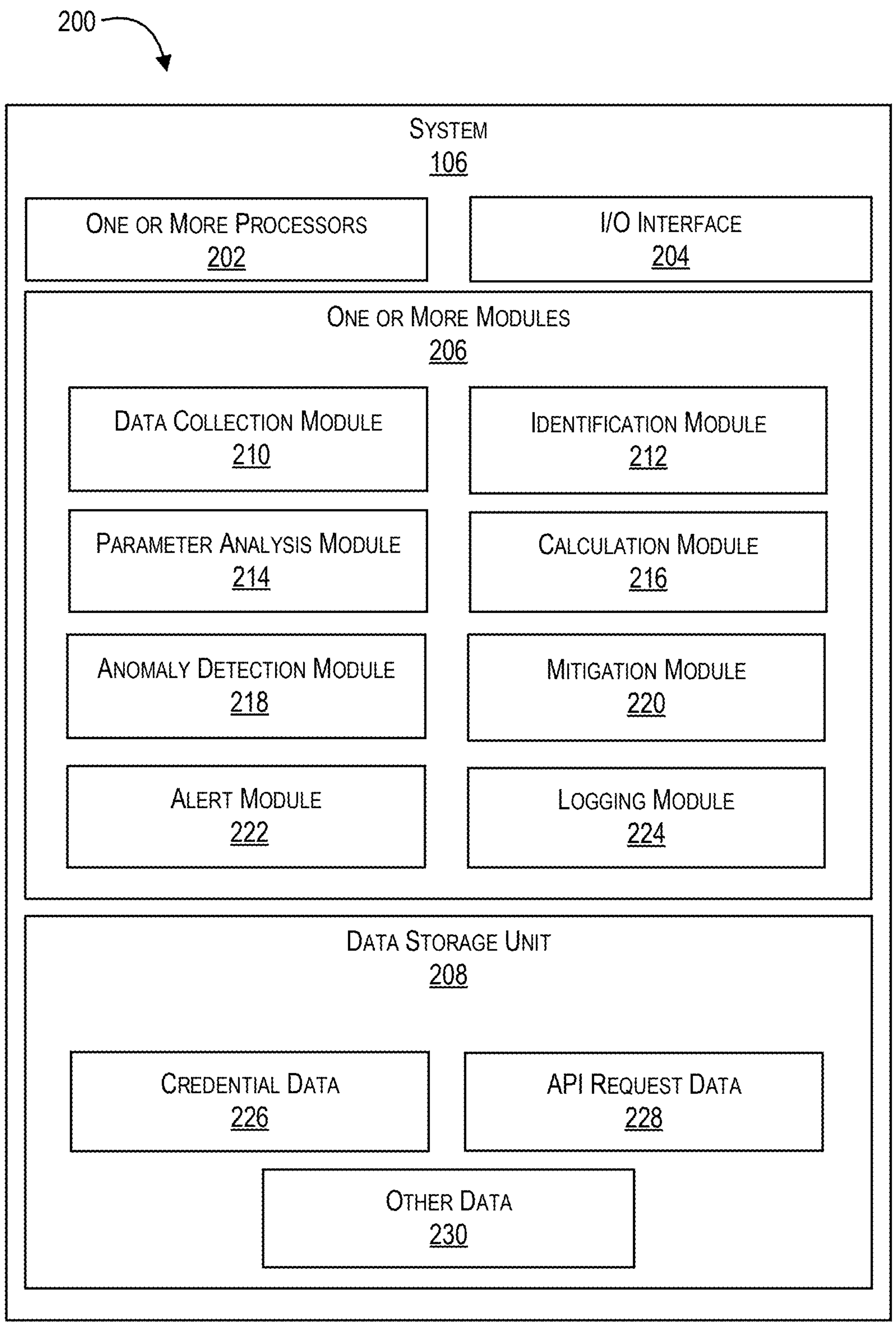
FIG. 2 illustrates a block diagram of the system for detecting and preventing credential stuffing attacks, in accordance with an embodiment of the present disclosure.
Figure 3:
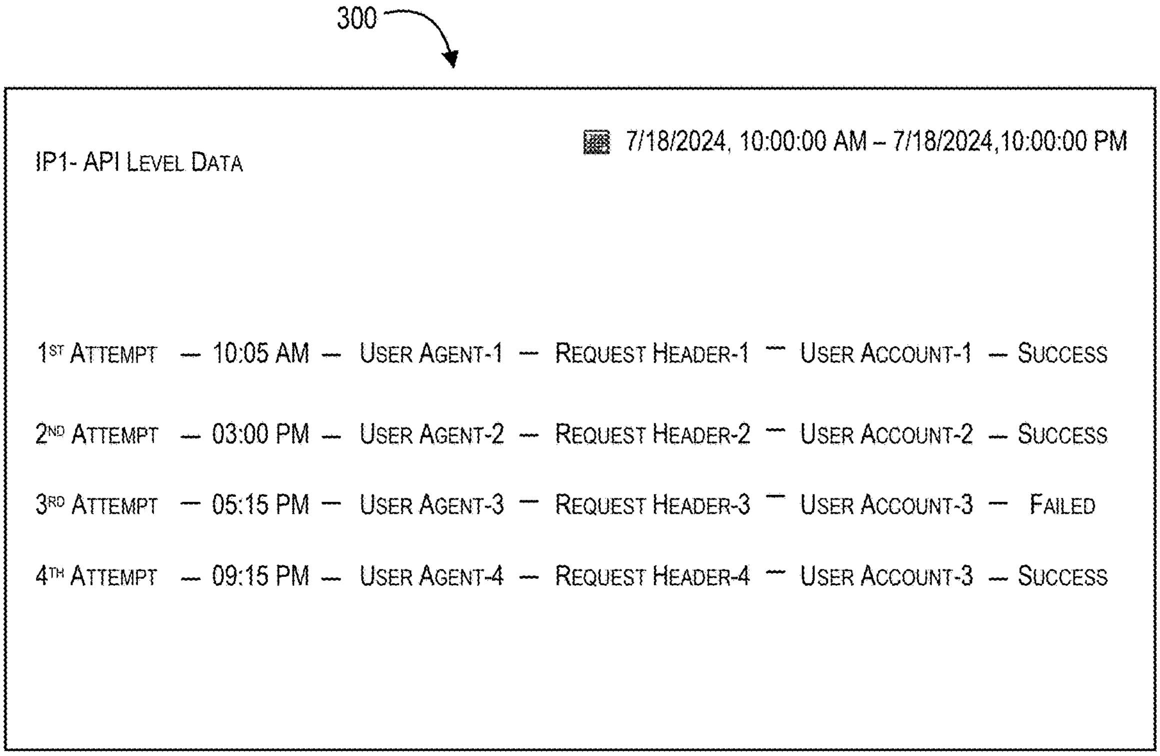
FIG. 3 illustrates an interface showing exemplary good IPs in a 12-hour window, in accordance with an embodiment of the present disclosure.
Figure 4:
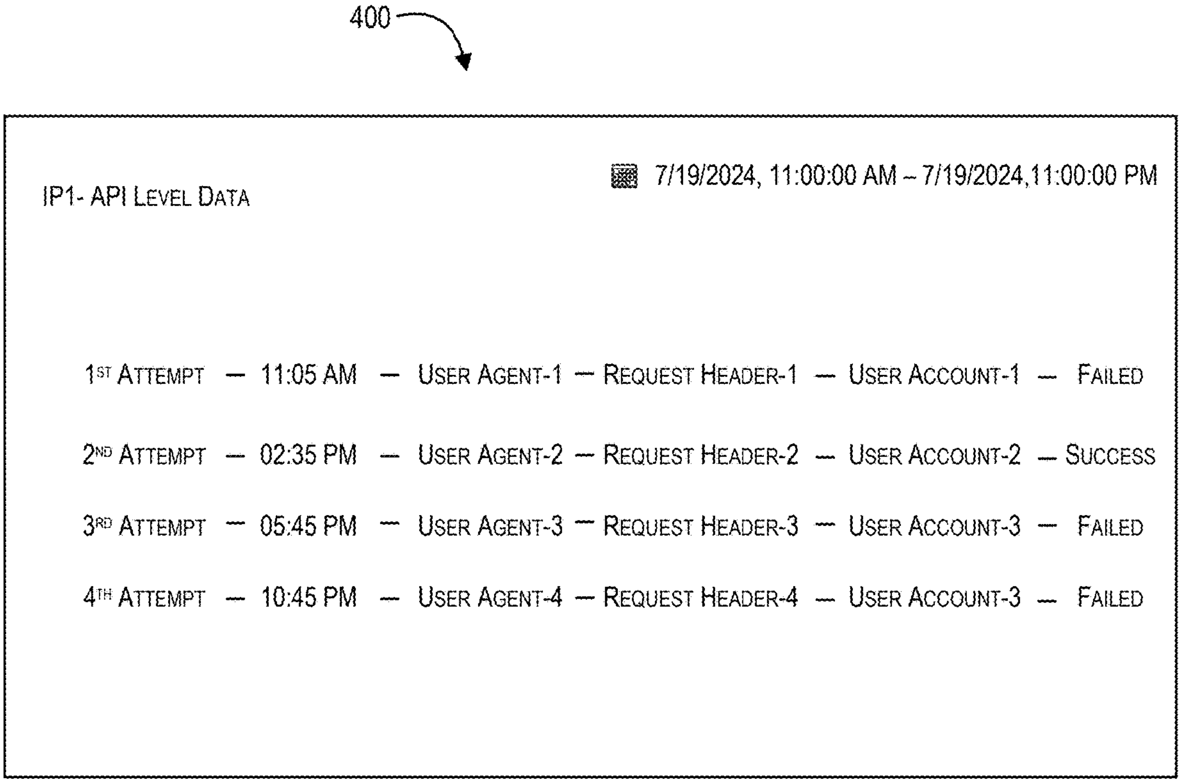
FIG. 4 illustrates an interface showing exemplary bad IPs in a 12-hours window, in accordance with an embodiment of the present disclosure.

FIG. 2 illustrates a block diagram 200 of the system 106 for detecting and preventing credential stuffing attacks, in accordance with an embodiment of the present disclosure. FIG. 3 illustrates an interface 300 showing exemplary good IPs in a 12-hour window, in accordance with an embodiment of the present disclosure. FIG. 4 illustrates an interface 400 showing exemplary bad IPs in a 12-hours window, in accordance with an embodiment of the present disclosure. For the sake of brevity, FIGS. 2, 3, and 4 have been explained together. It may be apparent to a person skilled in the art that the exemplary 12-hour window is illustrated merely for the purpose of explanation and this window may vary based on user requirements without departing from the scope of the disclosure. Further, for the purpose of the disclosure, the bad IPs may correspond to fraudulent and/or malicious IPs.

In an embodiment, the system 106 may include one or more processors 202, an Input/Output (I/O) interface 204, one or more modules 206, and a data storage unit 208. The one or more processors 202 may be implemented as one or more microprocessors microcomputers, microcomputers, digital signal processors, central processing units, state machines, logic circuitries, and/or any devices that manipulate signals based on operational instructions. Further, the I/O interface 204 may serve as the pivotal bridge connecting the internal processes of the system 106 with its external environment for facilitating the exchange of information between the system 106 and its users or external devices. Furthermore, the I/O interface 204 may contribute to the user experience by providing intuitive means for input, such as through keyboards or touchscreens, and presenting meaningful output via displays or other output devices. In an embodiment, the one or more modules 206 may include a data collection module 210, an identification module 212, a parameter analysis module 214, a calculation module 216, an anomaly detection module 218, a mitigation module 220, an alert module 222, a logging module 224, and any other module essential or required for the working of the system 106. In an embodiment, the data storage unit 208 may include the credential data 226, API request data 228, and any other data 230 required for the working of the system 106. In an embodiment of the present disclosure, the one or more processors 202 and the data storage unit 208 may form a part of a chipset installed in the system 106. In another embodiment of the present disclosure, the data storage unit 208 may be implemented as a static memory or a dynamic memory. In an example, the data storage unit 208 may be internal to the system 106, such as an onside-based storage. In another example, the data storage unit 208 may be external to the system 106, such as cloud-based storage. Further, the one or more module 206 may be communicatively coupled to the data storage unit 208 and the one or more processor 202 of the system 106. The one or more processors 202 may be configured to control the operations of the one or more modules 206.

In an embodiment, the data collection module 210 may receive data pertaining to the login attempts 110 from a plurality of sources (i.e., users 102). Further, the data collection module 210 may also collect information related to the source IP address, user-agent, request body and request headers of each login attempt. The data collection module 210 may operate continuously to ensure that a comprehensive dataset that reflects the full scope of login activity within the system 106 is captured. For example, consider a scenario where a popular online service experiences a sudden surge in login attempts from various IP addresses. The data collection module 210 may record each attempt, noting that the login requests are originating from different IPs but share a common user-agent string or a set of user-agent strings indicative of a specific type of automated tool often used in credential stuffing attacks.

In an embodiment, the identification module 212 may identify a set of sources as potentially malicious based on predefined criteria related to the login attempts. In order to identify potentially malicious sources, the identification module 212 may apply predefined criteria, including a threshold number of unique account login attempts within a specified time window from a single IP address. For example, an IP address attempts to log in to 25 different accounts within 30 minutes and with more than x % (90%) failed attempts. Since this exceeds the threshold of 20 accounts per hour, the IP is flagged as potentially malicious.

It may be apparent to a person skilled in the art that other predefined criteria may be used without departing from the scope of the disclosure. In an example, such predefined criteria may correspond to high failure rate i.e. if the failure rate of login attempts from a single source exceeds a certain percentage. For example, an IP address makes 100 login attempts, but 95 of them fail. The 95% failure rate surpasses the predefined threshold of 90%, flagging the IP for further investigation. In another example, such predefined criteria may correspond to frequency of login attempts i.e., if the number of login attempts from a single IP address within a short period (e.g., more than 5 attempts within 1 minute) exceeds a set limit. For example, an IP address sends 10 login requests within a minute. The frequency exceeds the allowed 5 attempts per minute, triggering a flag for potential automated attack activity. In yet another example, such predefined criteria may correspond to geolocation anomalies i.e., if login attempts from a single account are detected from widely varying geolocations within a short time span. For example, a user's account has login attempts from both New York and Tokyo within 5 minutes. The geolocation anomaly, given the time difference, raises a flag for possible credential stuffing or account compromise. In yet another example, such predefined criteria may correspond to suspicious user-agent strings i.e., if login attempts from multiple sources share an uncommon or suspicious user-agent string, indicating the use of a bot or automated tool. For example, multiple login attempts from different IP addresses all use a user-agent string associated with a known bot. The system flags these attempts for further analysis. In yet another example, such predefined criteria may correspond to abnormal time patterns i.e., if login attempts are made at unusual times that do not match the normal behavior for a particular user or region (e.g., during the early morning hours). For example, an account usually has login activity during the day, but suddenly there are attempts made at 3 AM. The system flags this time pattern as suspicious. In yet another example, such predefined criteria may correspond to consistency in failed attempts across IPs i.e., if multiple IP addresses consistently fail to log in to the same accounts, it could indicate a distributed credential stuffing attack. For example, multiple IPs fail to log in to a single user account, each with a failure rate exceeding 80%. The consistency across different IPs raises suspicion and triggers a flag.

In an illustrated example, as shown in FIG. 3, a 12-hour (i.e. 10:00 AM to 10:00 PM on Jul. 18, 2024) API level data corresponding to IP1 may have 4 login attempts. First attempt may be a successful attempt at 10:05 AM for user account 1 having a user agent 1 and a request header 1. Second attempt may be a successful attempt at 3:00 PM for user account 2 having a user agent 2 and a request header 2. Third attempt may be a failed attempt at 5:15 PM for user account 3 having a user agent 3 and a request header 3. Fourth attempt may be a successful attempt at 9:15 PM for user account 3 having a user agent 4 and a request header 4. In an embodiment, the threshold for failed attempts to identify a bad IP may be 50 percent and since the failed login percentage is 25% (1 out of 4) for this IP, the IP may be termed as a good IP.

In an illustrated example, as shown in FIG. 4, a 12-hour (i.e. 10:00 AM to 10:00PM on Jul. 19, 2024) API level data corresponding to IP1 may have 4 login attempts. First attempt may be a failed attempt at 11:05 AM for user account 1 having a user agent 1 and a request header 1. Second attempt may be a successful attempt at 2:35 PM for user account 2 having a user agent 2 and a request header 2. Third attempt may be a failed attempt at 5:45 PM for user account 3 having a user agent 3 and a request header 3. Fourth attempt may be a failed attempt at 10:45 PM for user account 3 having a user agent 4 and a request header 4. In an embodiment, the threshold for failed attempts to identify a bad IP may be 50 percent and since the failed login percentage is 75% (3 out of 4) for this IP, the IP may be termed as a bad IP.

In an embodiment, the parameter analysis module 214 may determine one or more common parameters shared among the identified set of potentially malicious sources. Further, the parameter analysis module 214 may analyze one or more common parameters including IP subnet, autonomous system number (ASN), IP organization, user-agent string, and/or request header fields. By identifying the one or more common parameters, the parameter analysis module 214 may determine whether the flagged sources are part of a coordinated attack for discerning patterns that are not immediately obvious from individual login attempts but become clear when examining the data collectively across multiple dimensions. For example, suppose the identification module 212 has flagged 500 IP addresses as potentially malicious because each IP has tried to log into numerous accounts with a high failure rate. The parameter analysis module 214 may then examines these 500 IP addresses and discovers that 400 of them originate from the same IP subnet and 350 share a similar user-agent string. These common parameters suggest that the attacks are coordinated, possibly coming from a botnet using the same infrastructure or automated tool. The identification of these commonalities enables the system 106 to detect that these login attempts are likely part of a broader credential stuffing attack. Consequently, the system 106 can take targeted actions, such as blocking traffic from the identified IP subnet or user-agent string, to prevent further unauthorized access attempts.

In an embodiment, the calculation module 216 may calculate a percentage of the potentially malicious sources from the one or more common parameters for determining whether the observed patterns are statistically significant and indicative of a coordinated credential stuffing attack. By converting such qualitative data into a quantitative measure, the calculation module 216 helps the system 106 to objectively assess the likelihood of an attack based on predefined thresholds. In an example, the calculation module 216 may identify that 400 out of 500 flagged IP addresses share the same IP subnet and the total attempts from that IP subnets are 1000. Thus, the percentage of bad IPs from the associated IP subnet is 40%. Similarly, the calculation module 216 may also find that 60% of the IPs from a particular user-agent string are flagged IPs.

In an embodiment, the anomaly detection module 218 may detect an anomaly indicative of a credential stuffing attack if the calculated percentage exceeds a predefined threshold. Further, the anomaly detection module 218 may refine the predefined threshold over time by analyzing historical data to improve the accuracy of anomaly detection. If the percentage of flagged sources sharing a particular parameter, such as an IP subnet or user-agent string, exceeds the established threshold, the anomaly detection module 218 may identify this as a significant deviation from normal behavior. For example, consider a scenario where the calculation module 216 identifies that 40% of the IPs from an IP subnet are flagged IPs and 60 percent of the IPs having a particular user-agent strings are flagged IPs. Further, if the predefined threshold for detecting an anomaly is set at 30% for IP subnet, the calculation module's output of 40% indicates that this is a significant pattern, likely representing a coordinated attack. Also, if the threshold for the user-agent strings is 50%, the anomaly detection module 218 may further ensure that there is an ongoing credential stuffing attack.

In an embodiment, the mitigation module 220 may block and/or mitigate login attempts associated with the detected anomaly. Further, the mitigation module 220 may block API traffic associated with the detected anomaly by dynamically adjusting firewall rules and updating access control lists. Also, the mitigation module 220 may apply different levels of traffic blocking and mitigation based on the severity of the detected anomaly, including temporary blocking and/or permanent blacklisting of sources. For example, after the anomaly detection module 218 flags an IP subnet where 40% of the IP addresses are deemed potentially malicious, the mitigation module 220 may immediately block all incoming traffic from this subnet to prevent further login attempts. In another scenario, if the threat level is deemed lower, the mitigation module 220 may implement a temporary block or rate limit traffic from the suspicious sources, allowing legitimate users time to verify their credentials without full disruption.

In an embodiment, the alert module 222 may generate an alert to notify a system administrator when a credential stuffing attack is detected. When the system 106 detects a credential stuffing attack or any suspicious activity, the alerts module 222 may generate and send notifications to designated personnel, such as through emails, SMS messages, or dashboard notifications, ensuring that administrators are promptly aware of any issues that require their attention. As a result, the designated personnel is facilitated for quick response to emerging threats, enabling them to take additional actions, such as investigating the incident or adjusting security settings, to further protect the system 106. For example, if the anomaly detection module 218 identifies that 80% of login attempts from a specific IP subnet are failing and/or the mitigation module 220 has blocked traffic from that subnet, the alerts module 222 may generate an alert that reads: "ALERT: Potential Credential Stuffing Attack Detected. 80% of login attempts from IP subnet 192.168.1.0/24 have failed. Traffic from this subnet has been temporarily blocked." This alert could be sent via email to the security team and displayed on the system's security dashboard. In another instance, if multiple user accounts experience failed login attempts from geographically disparate locations within a short timeframe, the alerts module 222 may send an SMS alert to the on-call administrator, allowing for immediate investigation.

In an embodiment, the logging module 224 may log details of the detected credential stuffing attack for future analysis and system improvements. For instance, the logging module 224 may maintain comprehensive records of all detected anomalies, mitigation actions, and system responses. The logging module 224 may capture detailed information about each event, creating a robust audit trail that can be used for future analysis, security reviews, and system improvements. The logs may, without any limitation, include data such as the time and date of the event, the source IP addresses involved, the parameters that triggered the anomaly detection, and the specific actions taken by the system in response. For example, when the system 106 detects a potential credential stuffing attack, the logging module 224 may record the following details: "Event ID: 12345 | Date: 2024 Aug. 11 | Time: 14:35:22 | Detected Anomaly: 85% of login attempts from IP subnet 192.168.1.0/24 failed | Mitigation Action: Traffic from the subnet blocked | Alert Sent: Yes." In another scenario, the module could log details such as, "Event ID: 12346 | Date: 2024 Aug. 11 | Time: 15:12:08 | Detected Anomaly: High volume of failed login attempts from multiple IPs using the same user-agent string | Mitigation Action: Temporary rate limiting applied | Alert Sent: No."

Figure 5B:
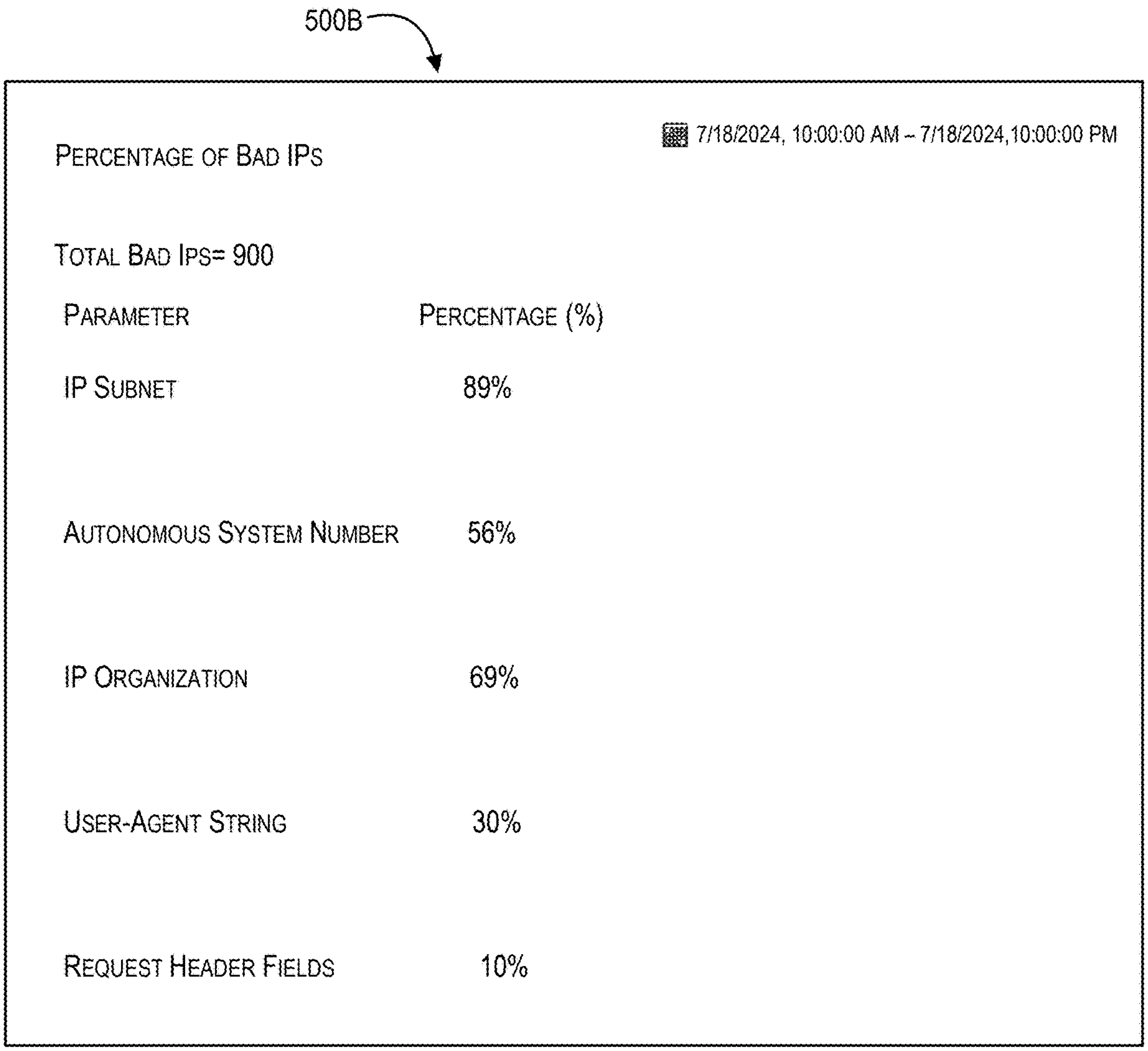
FIG. 5B illustrates an interface showing a percentage of the bad IPs from the one or more common parameters, in accordance with an embodiment of the present disclosure.

FIG. 5A illustrates an interface 500A showing the bad IPs grouped based on one or more common parameters, in accordance with an embodiment of the present disclosure. FIG. 5B illustrates an interface 500B showing a percentage of the bad IPs from the one or more common parameters, in accordance with an embodiment of the present disclosure. FIG. 5C illustrates an interface 500C showing anomaly detection and blocking of connection based on a threshold value, in accordance with an embodiment of the present disclosure. For the sake of brevity, FIGS. 5A, 5B, and 5C have been explained together.

In an exemplary embodiment, as illustrated in FIG. 5A, a 12-hour (i.e. 11:00 AM to 11:00 PM on Jul. 19, 2024) data pertaining to identified bad IPs may be categorized based on the one or more common parameters such as IP subnet, autonomous system number, IP organization, user-agent string, and request header field. In an illustrated embodiment, the interface 500A may show that total bad IPs are 900 out of which 800 have same IP subnet, 500 have same autonomous system number, 625 have same IP organization, 273 have same user-agent string, and 90 have same request header fields. As explained in the previous paragraph, these common parameters may suggest that the attacks are coordinated, possibly coming from a botnet using the same infrastructure or automated tool. Next, as illustrated in FIG. 5B, a percentage of the potentially malicious sources from the one or more common parameters may be calculated to determine whether the observed patterns are statistically significant and indicative of a coordinated credential stuffing attack. The percentage of bad IPs corresponding to a particular parameter may be against the total IPs associated with that particular parameter, for example, as illustrated, 89% of bad IPs having same IP subnet would mean that the out of 100 IPs associated with a particular IP Subnet 89 are bad IPs. In an illustrated embodiment, the interface 500B may show that the percentage of bad IPs from an IP subnet is 89%, an autonomous system number is 56%, an IP organization is 69%, a user-agent string is 30%, and a request header field is 10%. Thereafter, as illustrated in FIG. 5C, anomaly indicative of a credential stuffing attack may be detected if the calculated percentage exceeds a predefined threshold for a particular parameter. In an illustrated embodiment, the interface 500C may show that the predefined percentage may be 50%, thus, IP subnet having 89% may be detected as an anomaly, autonomous system number having 56% may be detected as an anomaly, IP organization having 69% may be detected as an anomaly, user-agent string having 30% may not be detected as an anomaly, and request header field having 10% may not be detected as an anomaly. In an embodiment, the connections associated with the parameters that are detected as anomalies may be blocked. It may be noted that a single threshold for all parameters has been used for illustrative purposes and for the sake of brevity, but as explained above there may be a predefined threshold for each parameter, such as IP subnet may have a predefined threshold of 50%, autonomous system number may have a predefined threshold of 60%, IP organization may have a predefined threshold of 30%, user-agent string may have predefined threshold of 40%, and the request header fields may have a predefined threshold of 20%.

Figure 6:
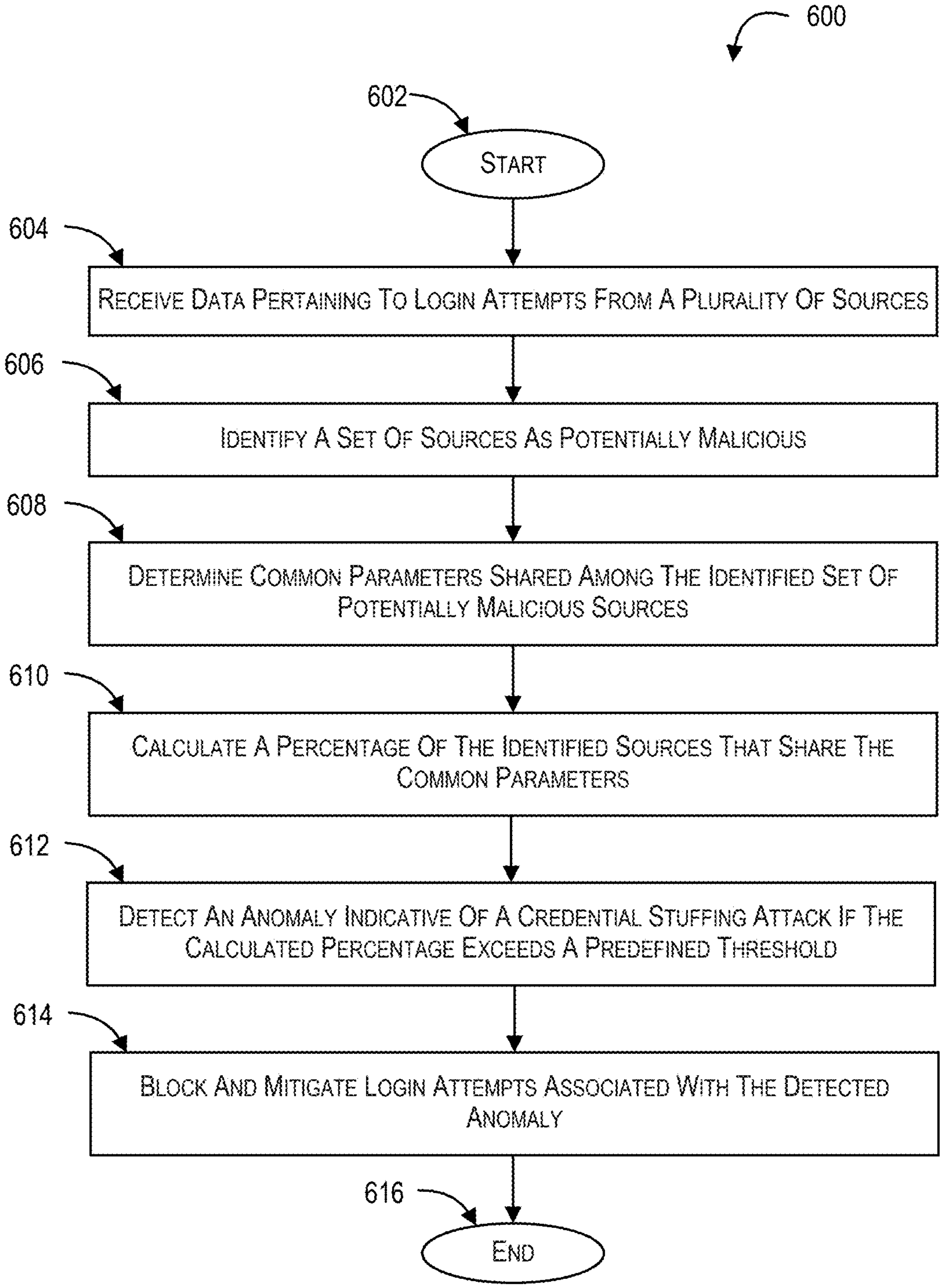
FIG. 6 is a flow chart of a method for detecting and preventing credential stuffing attacks, in accordance with an embodiment of the present disclosure.

FIG. 6 is a flow chart 600 of a method for detecting and preventing credential stuffing attacks, in accordance with an embodiment of the present disclosure. The method starts at step 602.

At first, data pertaining to login attempts may be received from a plurality of sources, at step 604. Further, the method may include the steps of collecting information related to the source IP address, user-agent, and request headers of each login attempt. Next, at step 606, a set of sources as potentially malicious may be identified based on predefined criteria related to the login attempts. For identifying, the method may include the steps of applying predefined criteria, including a threshold number of unique account login attempts within a specified time window from a single IP address, to identify potentially malicious sources.

Next, at step 608, one or more common parameters shared among the identified set of potentially malicious sources may be determined. Further, the method may include the steps of analyzing one or more common parameters including IP subnet, autonomous system number (ASN), IP organization, user-agent string, and/or request header fields. Next, at step 610, a percentage of the potentially malicious sources from the one or more common parameters may be calculated. Next, at step 610, an anomaly indicative of a credential stuffing attack is detected if the calculated percentage exceeds a predefined threshold. In an embodiment, the method may include the steps of refining the predefined threshold over time by analyzing historical data to improve the accuracy of anomaly detection.

Thereafter, at step 612, login attempts associated with the detected anomaly may be blocked and/or mitigated. In an embodiment, the method may include the steps of blocking API traffic associated with the detected anomaly by dynamically adjusting firewall rules and updating access control lists. Further, the method may include the steps of applying different levels of traffic blocking and mitigation based on the severity of the detected anomaly, including temporary blocking and permanent blacklisting of sources. In an embodiment, the method may further include the steps of generating an alert to notify a system administrator when a credential stuffing attack is detected. In an embodiment, the method may include the steps of logging details of the detected credential stuffing attack for future analysis and system improvements.

The disclosed mechanism is particularly useful for any online platform or service that requires secure user authentication, including e-commerce sites, financial institutions, social media platforms, and corporate networks. The primary advantage of the disclosed mechanism is the ability to detect and prevent credential stuffing attacks that might go unnoticed by traditional security measures, especially those that rely on rate-limiting or IP-based blocking alone. By analyzing data patterns across multiple dimensions and identifying commonalities among potentially malicious sources, the disclosed mechanism provides a more nuanced and effective defense against distributed and low-and-slow credential stuffing attacks. Additionally, the disclosed mechanism helps to maintain the integrity of user accounts, reducing the risk of unauthorized access and protecting sensitive information. Thus, the disclosed mechanism enhances the overall security posture of the organization and builds trust with users by safeguarding their credentials against abuse.

Figure 7:
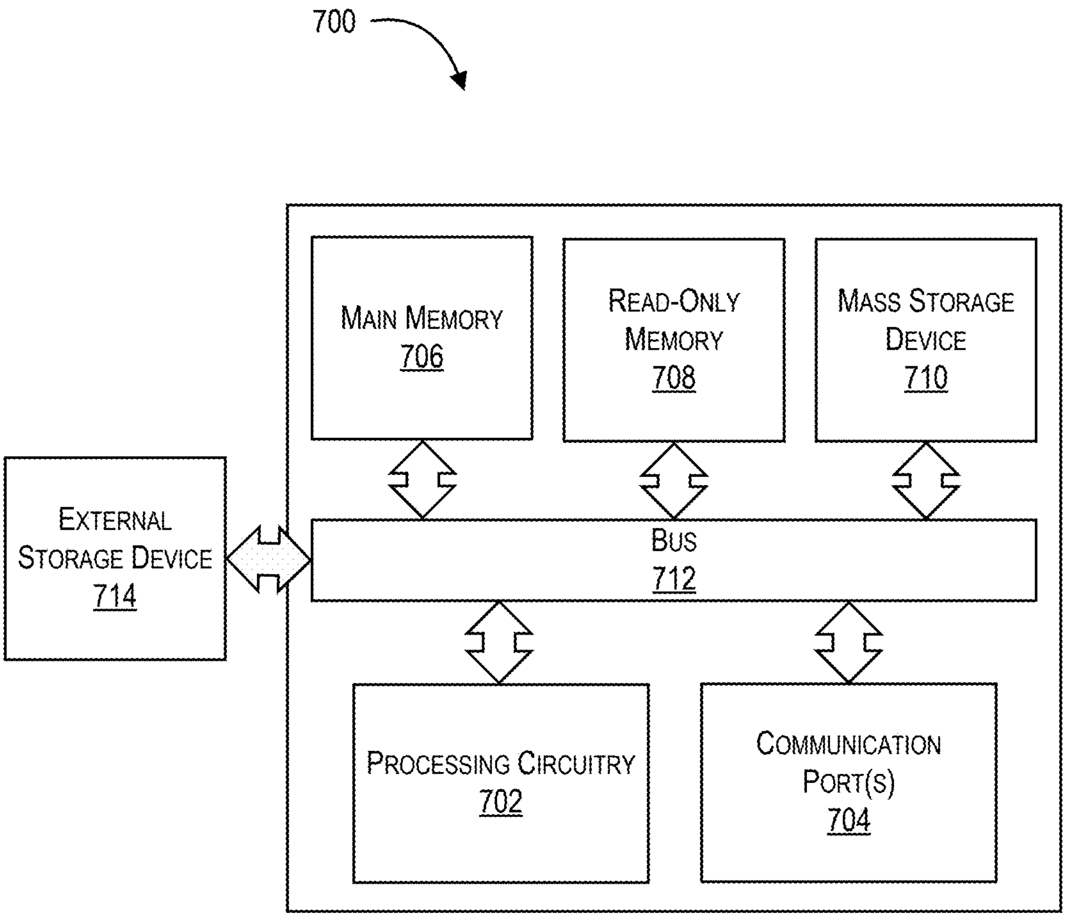
FIG. 7 illustrates an exemplary computer unit in which or with which embodiments of the present disclosure may be utilized.

FIG. 7 illustrates an exemplary computer system in which or with which embodiments of the present disclosure may be utilized. As shown in FIG. 7, a computer system 700 includes an external storage device 714, a bus 712, a main memory 706, a read-only memory 708, a mass storage device 710, a communication port 704, and a processor 702.

Those skilled in the art will appreciate that computer system 900 may include more than one processor 702 and communication ports 704. Examples of processor 702 include, but are not limited to, an Intel® Itanium® or Itanium 2 processor(s), or AMD® Opteron® or Athlon MP® processor(s), Motorola® lines of processors, FortiSOC™ system on chip processors or other future processors. The processor 702 may include various modules associated with embodiments of the present disclosure.

The communication port 704 can be any of an RS-232 port for use with a modem-based dialup connection, a 10/100 Ethernet port, a Gigabit or 10 Gigabit port using copper or fiber, a serial port, a parallel port, or other existing or future ports. The communication port 704 may be chosen depending on a network, such as a Local Area Network (LAN), Wide Area Network (WAN), or any network to which the computer system connects.

The memory 706 can be Random Access Memory (RAM), or any other dynamic storage device commonly known in the art. Read-Only Memory 708 can be any static storage device(s) e.g., but not limited to, a Programmable Read-Only Memory (PROM) chips for storing static information e.g., start-up or BIOS instructions for processor 702.

The mass storage 710 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus 712 communicatively couples processor(s) 702 with the other memory, storage, and communication blocks. The bus 712 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 702 to a software system.

Optionally, operator and administrative interfaces, e.g., a display, keyboard, and a cursor control device, may also be coupled to bus 704 to support direct operator interaction with the computer system. Other operator and administrative interfaces can be provided through network connections connected through communication port 704. The external storage device 714 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

What is claimed is:

1. A system for detecting and preventing credential stuffing attacks, the system comprising:
- a processor; and
- a memory communicatively coupled to the processor, the memory storing instructions that, when executed by the processor, cause the processor to:
  - receive data pertaining to login attempts from a plurality of sources;
  - identify a set of sources, from the plurality of sources, as potentially malicious based on predefined criteria related to the login attempts;
  - determine one or more common parameters shared among the set of sources identified as potentially malicious;
  - calculate a percentage of the identified set of potentially malicious sources that share the one or more common parameters;
  - detect an anomaly indicative of a credential stuffing attack when the calculated percentage exceeds a predefined threshold, the detected anomaly having a severity; and
  - perform at least one of: block and mitigate login attempts associated with the detected anomaly, wherein the at least blocking and mitigating login attempts comprises applying one or more levels of traffic blocking and mitigation based on the severity of the detected anomaly, and wherein the one or more levels of traffic blocking and mitigation comprises temporary blocking and permanent blacklisting of sources.

2. The system of claim 1, wherein the processor is further configured to collect information related to a source IP address, user-agent, and request headers of each login attempt.

3. The system of claim 1, wherein the processor is further configured to apply predefined criteria, including a threshold number of unique account login attempts within a specified time window from a single IP address, to identify the potentially malicious sources.

4. The system of claim 1, wherein the processor is further configured to analyze one or more common parameters including at least one of: IP subnet, autonomous system number (ASN), IP organization, user-agent string, and request header fields.

5. The system of claim 1, wherein the processor is further configured to block network traffic associated with the detected anomaly by dynamically adjusting firewall rules and updating access control lists.

6. The system of claim 1, wherein the processor is further configured to refine the predefined threshold over time by analyzing historical data to improve an accuracy of anomaly detection.

7. The system of claim 1, wherein the processor is further configured to generate an alert to notify a system administrator when a credential stuffing attack is detected.

8. The system of claim 1, wherein the processor is further configured to log details of the detected credential stuffing attack for future analysis and system improvements.

9. A method for detecting and preventing credential stuffing attacks, the method comprising:
- receiving, by a processor, data pertaining to login attempts from a plurality of sources;
- identifying, by the processor, a set of sources as potentially malicious based on predefined criteria related to the login attempts;
- determining, by the processor, one or more common parameters shared among the set of sources identified as potentially malicious;
- calculating, by the processor, a percentage of the identified set of potentially malicious sources the share the one or more common parameters;
- detecting, by the processor, an anomaly indicative of a credential stuffing attack if the calculated percentage exceeds a predefined threshold, the detected anomaly having a severity; and
- performing, by the processor, at least one of: blocking and mitigating login attempts associated with the detected anomaly, wherein the at least blocking and mitigating login attempts comprises applying one or more levels of traffic blocking and mitigation based on the severity of the detected anomaly, and wherein the one or more levels of traffic blocking and mitigation comprises temporary blocking and permanent blacklisting of sources.

10. The method of claim 9, further comprising collecting information related to a source IP address, user-agent, and request headers of each login attempt.

11. The method of claim 9, further comprising applying predefined criteria, including a threshold number of unique account login attempts within a specified time window from a single IP address, to identify the potentially malicious sources.

12. The method of claim 9, further comprising analyzing one or more common parameters including at least one of: IP subnet, autonomous system number (ASN), IP organization, user-agent string, and request header fields.

13. The method of claim 9, further comprising blocking network traffic associated with the detected anomaly by dynamically adjusting firewall rules and updating access control lists.

14. The method of claim 9, further comprising refining the predefined threshold over time by analyzing historical data to improve an accuracy of anomaly detection.

15. The method of claim 9, further comprising generating an alert to notify a system administrator when a credential stuffing attack is detected.

16. The method of claim 9, further comprising logging details of the detected credential stuffing attack for future analysis and system improvements.

* * * * *